May 16, 1933.  F. J. HORBACH  1,909,058
COUPLING
Filed April 10, 1931
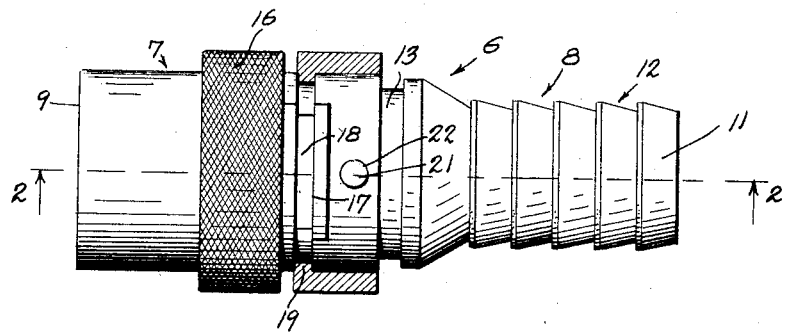
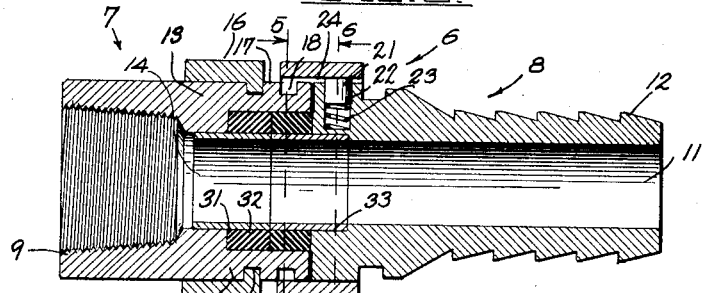
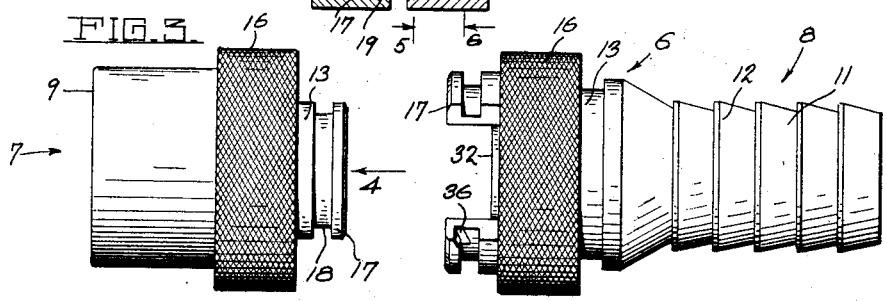
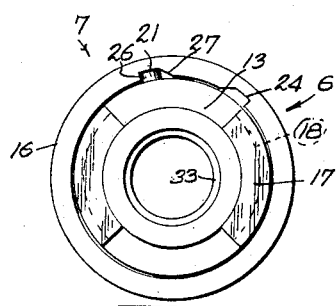 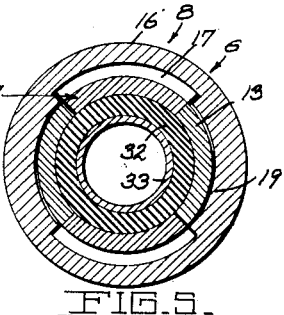 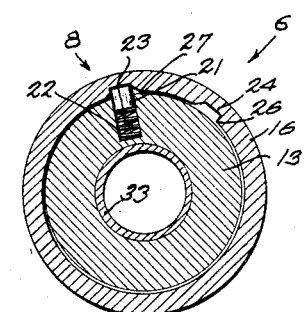
INVENTOR.
FRED. J. HORBACH
BY Hazard and Miller
ATTORNEYS.

Patented May 16, 1933

1,909,058

UNITED STATES PATENT OFFICE

FRED J. HORBACH, OF ANAHEIM, CALIFORNIA, ASSIGNOR TO SAFETY SALES COMPANY, A CORPORATION OF NEVADA

COUPLING

Application filed April 10, 1931. Serial No. 529,091.

This invention relates to coupling devices, and has for an object the provision of a coupling device which represents an improvement over that disclosed in Patent No. 1,248,558, issued December 4, 1917 to L. A. Scribner.

A more detailed object is to provide a coupling device whereby lengths of hose and other types of conduit may be substantially instantaneously joined and separated, and whereby a tight joint or seal may be made and maintained between the two members of the coupling device, but wherein improved and simplified details of construction have been employed so as to reduce the cost of construction, and to simplify the operation of the coupling.

The invention possesses other objects and advantageous features, some of which, with those enumerated, will be set forth in the following description of the invention's particular embodiment which is illustrated in the drawing accompanying and forming a part of the specification.

Referring to the drawing:

Fig. 1 is a side elevation, partially broken away and shown in section, of an improved coupling incorporating the principles of the present invention, the two members of the coupling device being joined to produce a tight joint therebetween.

Fig. 2 is a longitudinal sectional view taken upon the line 2—2 of Fig. 1, with the direction of view as indicated.

Fig. 3 is a side elevation, with the two members of the coupling separated.

Fig. 4 is an end elevation of one of the coupling members, the direction of view being indicated by the arrow 4 of Fig. 3.

Fig. 5 is a transverse sectional view taken upon the line 5—5 of Fig. 2, with the direction of view as indicated.

Fig. 6 is a transverse sectional view taken upon the line 6—6 of Fig. 2, with the direction of view as indicated.

The coupling of the present invention, which is indicated in its entirety at 6, comprises a pair of tubular members 7 and 8 adapted to be readily connected and disconnected so as to establish communication between two sections of a conduit, such as a flexible hose, or to connect a hose to a faucet or other type of conduit. Accordingly, each section 7, 8 is provided with the appropriate type of attaching means, for example, the section 7 is provided with an interiorly threaded, tubular extension 9, whereby the section 7 may be screwed onto a conventional faucet; and the section 8 is provided with a tubular extension 11 having exterior annular beads 12, whereby the end of a hose may be permanently attached thereto.

In other respects, the two coupling members 7, 8 are of identical construction. Each comprises a tubular head 13, the bore 14 of which communicates with the bore of the associated extension 9, 11. Rotatably mounted upon the head 13 of each section is a collar 16. Locking extensions 17 are provided upon each of the heads 13. In the form shown there are two such extensions on each head 13. These extensions 17 define segments of a cylinder, and the spacing between the extensions 17 of each head is equal in width to the extensions themselves, thereby permitting the extensions 17 of one head to be inserted into the spaces between the extensions of the other head, thereby disposing the two members 6, 7 with their extensions arranged alternately and defining a substantially complete cylinder, and bringing the bores 14 of the two members 6 and 7 into registry with each other.

In the outer surface of the extensions 17 segmental annular grooves 18 are formed, there being two such grooves in each extension 17, and the parts being so proportioned and arranged that when the two members 6, 7 are juxtaposed the grooves 18 of the two members will register with each other, thereby defining two complete annular grooves encircling the cylinder defined by the cooperative extensions 17.

Each of the collars 16 is provided with segmental annular flanges 19 extending inwards from the inner surface thereof to be received within the grooves 18. The number of such flanges 19 carried by each collar 16 is equal to the number of extensions 17 on the associated coupling member, and each of the segmental annular flanges 19 substantially corresponds in length to one of the segmental grooves 18, so that when the collar 16 is turned to one position, the flanges 19 thereof may be completely received within the grooves 18 of the associated extensions 17.

Whereas two series of grooves 18 are formed in the extensions 17 of each head 13, the flanges 19 of each collar 16 engage within the grooves 18 of only one series of the associated extensions, it being understood that the extensions 17 project beyond the outer end of the associated collar 16, permitting them to be received within the interior of the collar 16 of the other head 13, whereupon rotation of the collar of the said other head will seat the flanges 19 of that collar within the grooves 18 of the extensions 17 which have been thrust thereinto. It is intended that both collars 16 shall be rotated, and in opposite directions, after the extensions 17 have been engaged with each other, thereby seating the flanges 19 of each collar within grooves 18 of the extensions 17 of both coupling members 6 and 7, the result being that the members are firmly locked together.

Means are provided for limiting the distance that each collar 16 rotates, and for releasably retaining the collar in either of its extreme positions of rotation. Inasmuch as when in released position the flanges 19 are seated entirely within the segmental annular grooves 18, and when in locked position the collars 16 have been turned only far enough to position one-half the length of each segmental flange 19 within the groove 18 of the other head, it becomes apparent that each collar is intended to rotate through an arc, the central angle of which is only one-half as large as the central angle of the arc described by each of the segmental grooves 18. This results in positioning each segmental flange 19 with one-half its length in a groove 18 of one head 13, and the other half of its length in a segmental groove 18 of the other head 13, the result being that when thus positioned it would be necessary to shear the metal of all the flanges 19, in order to pull the coupling members 6 and 7 apart.

The means for limiting the extent of rotation of the collars 16 is in the form of a pin 21 associated with each head 13, being seated within a recess 22 therein and pressed radially outwards by means of a spring 23. Within the inner surface of each collar 16, angularly spaced notches 24 are formed, these notches being spaced a distance substantially equal to the distance through which it is desired to rotate the collar 16. The outer or distal edge 26 of each notch 24 is disposed in a substantially radial line, i. e., perpendicular to the direction of movement of the pin 21 with respect to that edge 26, the result being that when the collar 16 is rotated so as to bring one of the notches into registry with the pin 21, the pin 21 will drop into that notch, and by engagement with the shoulder 26 which is perpendicular to the direction of relative movement between the pin and the notch, prevent further rotation of the collar. However, the proximal edges 27 of the notches, i. e., those edges which are disposed toward each other, are inclined with respect to the direction of relative movement between the pin 21 and the notches, thereby producing a wedging action which forces the pin 21 back into its recess 22 when the collar 16 is turned in the reverse direction, after the pin 21 has once been seated in one of the notches. Accordingly, the pins 21 serve not only as spring-pressed detents to releasably retain the collars 16 in either of their extreme positions of rotation, but they also serve to prevent turning the collars beyond those extreme positions. It is important to prevent turning either collar 16 beyond that position in which its segmental flanges 19 have half their lengths withdrawn from the associated grooves 18, because if the collar 16 is turned far enough to completely withdraw the flanges 19 from the grooves 18, then the collar 16 can be slid off the associated end of the head 13, because of the fact that the flanges 19 will then be in registry with the spaces between the locking extensions 17, permitting free axial movement of the collar 16 with respect to the head 13.

An annular recess 31 is formed within the bore of each head 13, to receive a gasket 32, and preferably a short length of tubing 33 is affixed within the bore 14 of the head and extends through the interior of the annular gasket 32 to a position adjacent the outer end of the gasket, the purpose being to hold the gasket 32 in true annular form. Instead of extending all the way through the gasket 32, however, the tube 33 terminates slightly short of the extreme end of the gasket, the purpose being to permit the ends of the two gaskets 32 to come into abutment with each other as the coupling members 6 and 7 are juxtaposed, whereupon final interengagement of the coupling members to bring their respective segmental grooves 18 into registry will produce the necessary pressure of each gasket upon the other and a slight deformation thereof so as to establish a perfectly tight joint therebetween.

I have found that convenience is afforded in making the joint between the coupling members 6 and 7 by providing a slightly inclined entrance or throat 36 at that end of each segmental groove 18 into which the flange 19 of the collar 16 of the other head 13 is received when performing the locking operation. This overcomes any difficulty which would otherwise be present if the attempt were made to rotate the collars 16 to locking position without first bringing the grooves 18 of the opposed extensions 17 into accurate registry with each other.

In coupling or uniting the members 6 and 7, they are first placed with the locking extensions of one member opposite the spaces between the locking extensions of the other member, and the two members are then brought together until the segmental grooves 18 of the extensions 17 of both heads are substantially in registry with each other. This will permit rotating both collars 16 in opposite directions, so as to remove half the length of each flange 19 from the grooves 18 of the extensions of the associated head, and seat the portions of the flanges 19 thus removed, within the grooves 18 of the extensions of the other head, thereby securely locking the two coupling members 6 and 7 together.

I prefer that the various portions of my improved coupling device, with the exception of the springs 22 and gaskets 32, be constructed of a suitable grade of steel which is case-hardened subsequently to the machining operation. This prevents the relatively rapid wear which has been one of the detrimental factors in connection with the use of couplings of this general class previously employed, and insures a prolonged period during which my coupling can be subjected to hard usage without interfering with the smooth and rapid operation thereof.

It is to be understood that the details of the invention as herein disclosed, are subject to alteration within the spirit or scope of the appended claims.

I claim:

1. A coupling comprising tubular members having locking extensions adapted to interfit to define a substantially complete cylinder and having cooperative segmental grooves adapted to register to form substantially continuous annular grooves when the members are juxtaposed, a collar rotatable on each of said members and having segments of an annular flange adapted to be received within the grooves in the extensions of the associated member in one position and in the grooves of two adjacent extensions of different members in another position, either of said tubular member or said collar being provided with a spring pressed member, the other of said tubular member or said collar being provided with a pair of spaced notches adapted to receive said spring pressed member for releaseably holding said collar in either of said positions, said notches having distal edges provided with a shoulder to hold the collar against turning beyond said positions.

2. A coupling comprising two members, means for locking said members together comprising segmental locking extensions having annular grooves and operating collars having segmental annular flanges adapted to be rotated in said grooves, and means for releasably retaining said collars in selected position comprising a spring-pressed pin carried by each member and adapted to be received optionally in either of two notches in the associated collar, the proximal edges of said notches being inclined and the distal edges being perpendicular with respect to the direction of movement of said pin thereagainst, whereby the pin releasably retains the associated collar in selected position and also prevents the collar from being turned beyond either of its extreme positions.

In testimony whereof I have signed my name to this specification.

FRED J. HORBACH.